SELECTIVE WAVE FILTER

Filed April 24, 1946 3 Sheets-Sheet 1

INVENTOR.
GILBERT R. CLARK

BY

R P Morris
ATTORNEY

Feb. 12, 1952 G. R. CLARK 2,584,986

SELECTIVE WAVE FILTER

Filed April 24, 1946 3 Sheets-Sheet 2

INVENTOR.
GILBERT R. CLARK

BY

R P Morris
ATTORNEY

Feb. 12, 1952 G. R. CLARK 2,584,986

SELECTIVE WAVE FILTER

Filed April 24, 1946 3 Sheets-Sheet 3

INVENTOR.
GILBERT R. CLARK

BY

R P Morris
ATTORNEY

Patented Feb. 12, 1952

2,584,986

UNITED STATES PATENT OFFICE 2,584,986

SELECTIVE WAVE FILTER

Gilbert R. Clark, Nutley, N. J., assignor to Federal Telephone & Radio Corporation, New York, N. Y., a corporation of Delaware Application April 24, 1946, Serial No. 664,484

13 Claims. (Cl. 178—44)

This invention relates to electronic wave filtering systems and more particularly to filter systems capable of providing relatively sharp filtering at sub-audio, audio and intermediate frequencies.

In my copending application, Serial No. 591,894, filed May 4, 1945 (Clark 1), now abandoned, I have disclosed a filtering system which is based on the accumulative effect of stored oscillating energy, which energy is delivered to the system at a given frequency and at a constant phase. The system described therein provides for a selection of desired frequencies of a given phase and amplitude relationship providing a high degree of selectivity, such systems being designed to store energy in a static state instead of dynamically as has been the case in previous types of filters. Systems of this type are all basically "synchronous," that is, their operation depends on the storage of wave energy in synchronism with the frequency it is desired to filter out.

The present filter system has basic similarity to those disclosed in the above-named application insofar as: the storage of oscillating energy is static instead of dynamic; in that it requires a recurrent switching rate; and that the switching rate is related to the frequency or frequencies it is desired to select. However, while the previously disclosed filtering systems are based on the electro-mechanical performance of the necessary functions, the present system achieves these functions electronically.

It is an object of this invention to provide a highly selective electronic frequency filtering system.

It is a further object of the invention to provide an electronic filtering system which statically stores the applied oscillatory energy.

It is another object of the invention to provide a filtering system of the above-described type which electronically both commutates the applied signal wave in respect to energy storage means and recommutates the signal wave or a proportional equivalent thereof.

In accordance with certain features of the invention, I provide an electronic commutator which in effect subdivides the applied signal into a series of consecutive phase portions. Each phase portion is applied through a separate channel to respective electrostatic means to effectively add or subtract in respect to energy applied to submultiple storage means in synchronism with the frequency it is desired to filter out. Some of the energy which is commutated to the storage means is also used for recommutation from the storage means in respect to an output circuit where the presence of the desired frequency produces corresponding alternations in an otherwise unchanging output. In accordance with one of the features of the invention, the commutation and recommutation is achieved by means of diode rectifiers, while in accordance with another feature, triode electronic switches or modulators are employed. Wherever reference is made to commutation and recommutation throughout the description, it is intended that electronic switching and re-switching respectively are indicated, since the present invention involves, amongst other things, the commutation of alternating current to direct current and the recommutation of the direct current to alternating current.

While my invention itself is defined in the appended claims, the foregoing and other features and objects thereof will become more apparent and the invention best understood upon consideration of the following detailed description to be read in connection with the accompanying drawings in which:

Figure 1:
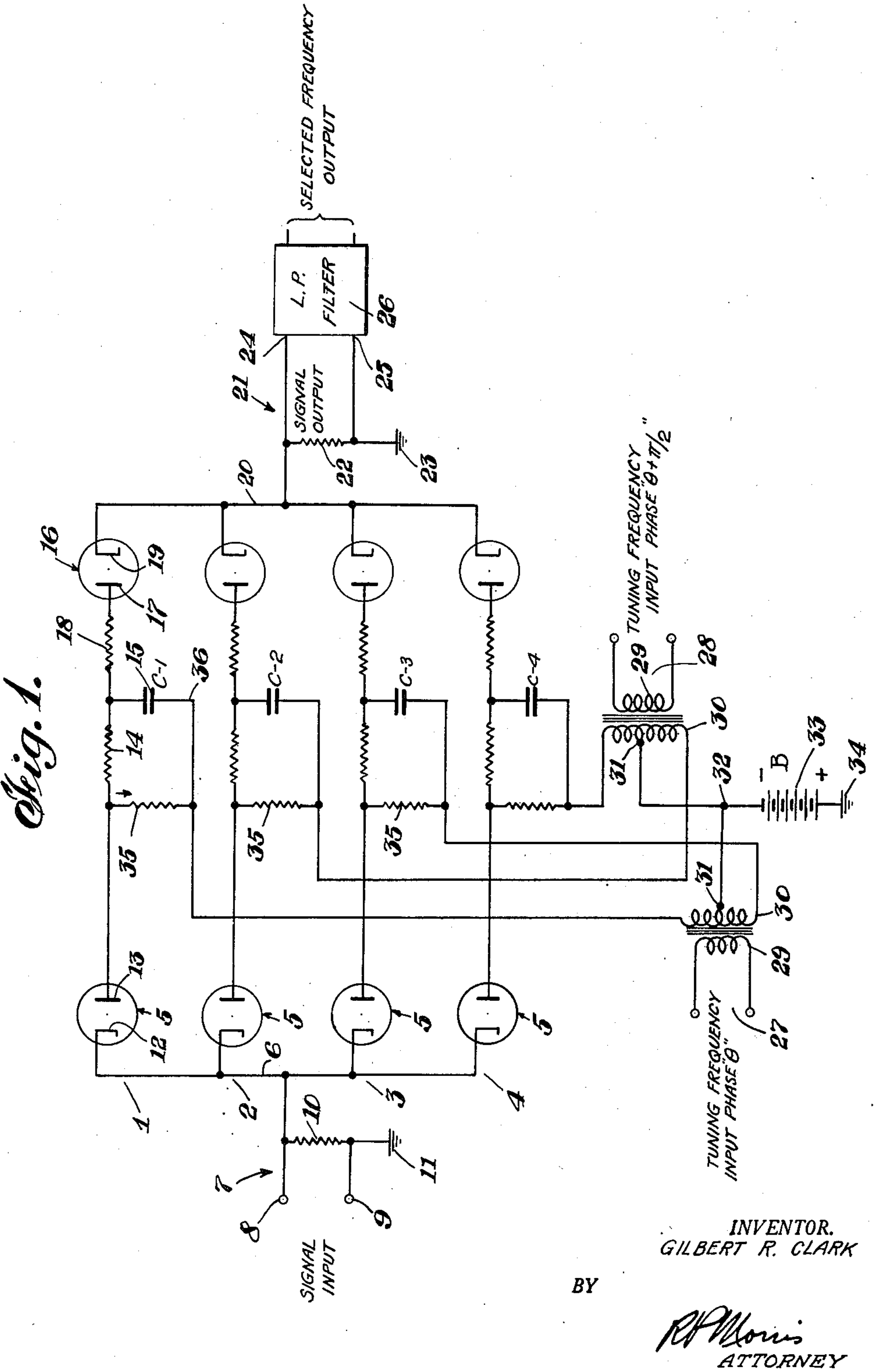
Fig. 1 is a diagram in schematic form of an electronic wave filter in accordance with my invention.

Referring to Fig. 1, the filter system shown therein comprises four identical phase portions or channels 1, 2, 3 and 4. Each of the phase portions or channels consists of a diode rectifier 5 having their cathodes connected together at 6. A connection is provided to the common conductor 6 from a signal input circuit 7 having input terminals 8 and 9 across which an input resistance 10 has been placed, one end of which is grounded at 11. Each diode rectifier 5 has a cathode 12 and an anode 13, the latter being connected to a time constant circuit including a resistance 14 and an electrostatic storage condenser 15. In each of the anode circuits of the rectifiers 5, and in series with the time constant resistance 14, there is provided a second diode rectifier 16, the anode 17 of which is in series with the resistance 14 through an associated anode resistance 18. Cathodes 19 of the rectifiers 16 are connected together at 20 and feed into an output circuit 21 across an output resistance 22 which is grounded at 23 and the voltage across which may be obtained at terminals 24 and 25. These terminals 24 and 25 are connected to an output low-pass filter 26 from which the filtered frequency may be obtained. Each of the phase channels 1, 2, 3 and 4 receives tuning frequency energy for commutating and recommutating the signal applied to the input circuit 7. This is accomplished by applying to the four channels a succession of commutating impulses obtained from two tuning frequency sources 27 and 28, the tuning frequency wave of the source 28 being 90° out-of-phase in respect to that of the source 27. The tuning frequency sources 27 and 28 each comprise a transformer having a primary 29 and a secondary 30, the latter having their midpoints 31 connected together at 32. The common point 32 of the two secondaries is also connected to the negative side of a B potential supply 33 which has its positive terminal grounded at 34. The voltage available across the terminals of the secondary of the source 27 is applied between the phase channels 1 and 3 and the secondary voltage of the source 28 is applied between channels 2 and 4. The secondary voltages of sources 27 and 28 are applied to the respective channels over resistances 35 at points between the anodes 13 and the resistances 14, a direct connection being provided from the source terminals to the free terminal of the storage condensers 15 as at 36.

Figure 2:
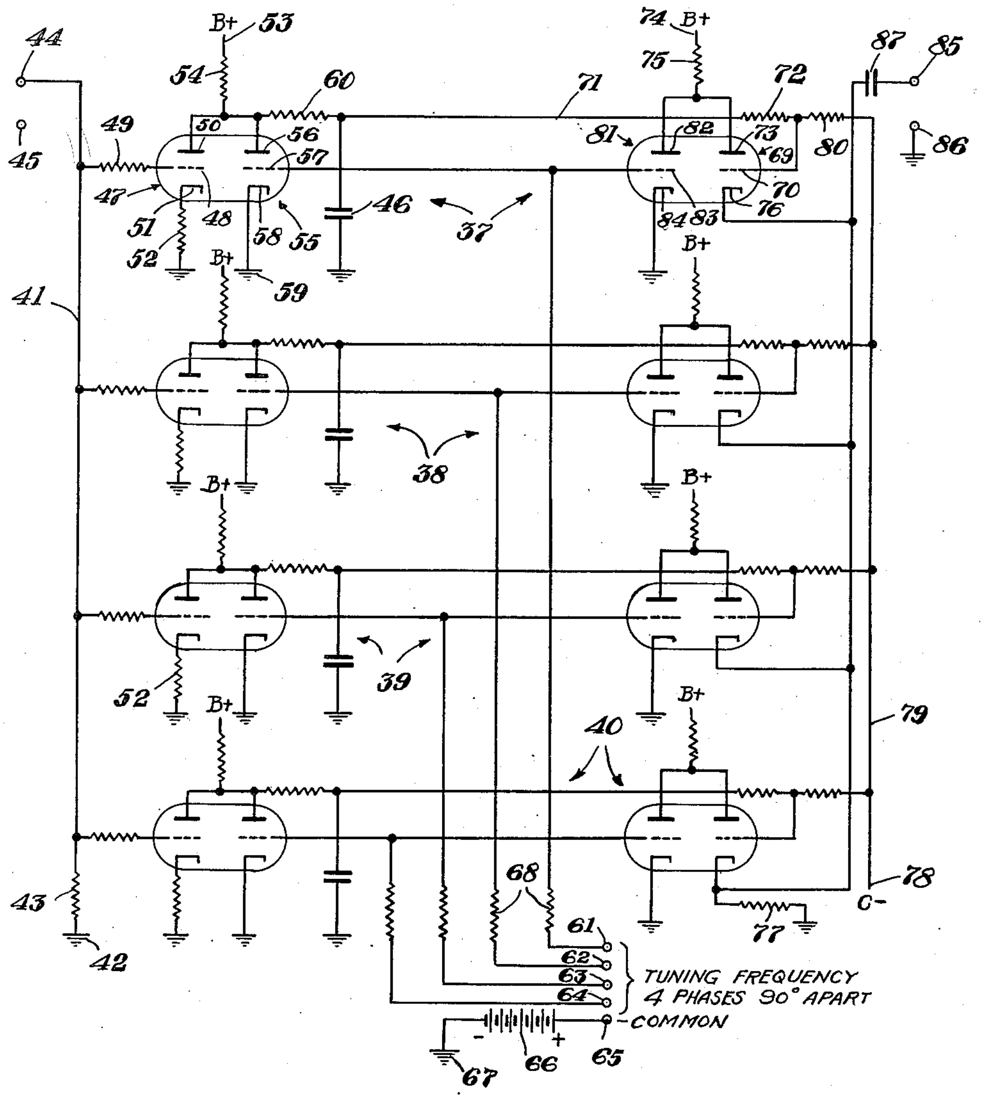
Fig. 2 is a schematic diagram of another form of electronic wave filter.

In the embodiment of the filter illustrated in Fig. 2, four separate phase channels have again been provided as at 37, 38, 39 and 40. The channels have a common input connection at 41 which is grounded at 42 through a resistance 43. The other end 44 of the connection 41 together with a grounded terminal 45 comprises the input circuit for the filter system. Each of the channels includes an electro-static storage device 46, the charge of which is controlled by an electronic switch arrangement including a triode 47 which has a grid 48 connected to the common connection 41 through a grid input resistance 49. The triodes 47 also include each an anode 50 and a cathode 51. The cathodes 51 are grounded over cathode resistances 52 and the anodes 50 are supplied from a B+ potential source at 53 over an anode dropping resistance 54. It is seen that the operation of the triode 47 is controlled by the voltage applied to the grid 48 thereof. The charge of the storage condenser 46 is at times controlled by the flow of current through triode 47, and at other times by the flow of current through a second triode 55 operatively associated with the triode 47. The triode 55, comprising an anode 56, a grid 57, and a cathode 58 has its anode 56 connected together with the anode 50 to resistor 54 to be energized from the B+ source 53. The cathode 58 is directly grounded at 59. The rate of charge on the condenser 46 is determined by a time constant circuit including resistor 60 in the circuit between the anode 56 and the condenser 46. The potentials on the grids 57 are supplied from two tuning frequency sources similar to sources 27 and 28 in the circuit of Fig. 1. In order to simplify the drawing, the sources themselves have not been shown, the terminals only being illustrated. There is a phase difference of 90° between the two sources so that the voltages at each of the four phase terminals 61, 62, 63 and 64 are 90° out-of-phase with respect to the voltages at adjacent terminals. Each of the terminals is connected to a corresponding grid 57 of the four phase channels. The midpoint of the source secondaries which is indicated by a common terminal 65 is held positive by connection to a suitable source of direct current potential 66 the negative terminal of which is grounded at 67. The respective grid phase potentials are applied over resistances 68. The potential of the storage condenser 46 is arranged to control the operability of another respective triode 69 by supplying a control voltage for the grid 70 thereof over a connection 71 and a resistor 72. Anodes 73 are supplied with an anode potential from a source of B+ potential at 74 over an anode dropping resistance 75, the cathodes 76 all being connected together to ground through an output resistance 77. The grids 70 are also subject to a negative potential from a source of C— as at 78 over a common grid connection 79 and respective associated resistors 80. The operation of the output triode 69 is in part controlled by an electronic switch associated therewith which takes the form of another triode 81 having an anode 82, a grid 83 and a cathode 84, the latter being directly grounded. The anode 82 is connected to the B+ potential source 74 through the resistor 75, the controlling potential on the grid 83 being obtained from the proper tuning frequency source terminals 61 through 64. The operability of the output triode 69 is thus determined by the anode current drawn by the electronic switch 81 depending on the grid potential thereof. The output circuit of the system comprises commonly connected cathodes 76 which feed two output terminals 85 and 86 to "take off" the potential across the resistance 77 through a D. C. blocking condenser 87.

In both of the instances illustrated the filtering action comprises the electrostatic storage of potential in condensers, and the commutation and recommutation of the desired signal wave, the commutation action both for the input and output consisting of electronic switching. In the embodiment of Fig. 1, the circuit is composed of four identical channels each of which includes a storage member. Whereas four storage members are provided for, it is understood that any other number could have been used but preferably not less than three. If it is desired that the response of the filter be restricted to the fundamental frequency, it is desirable to use not more than five storage members, although a greater number may be used if response is desired at harmonics of the applied frequency.

Figure 3:
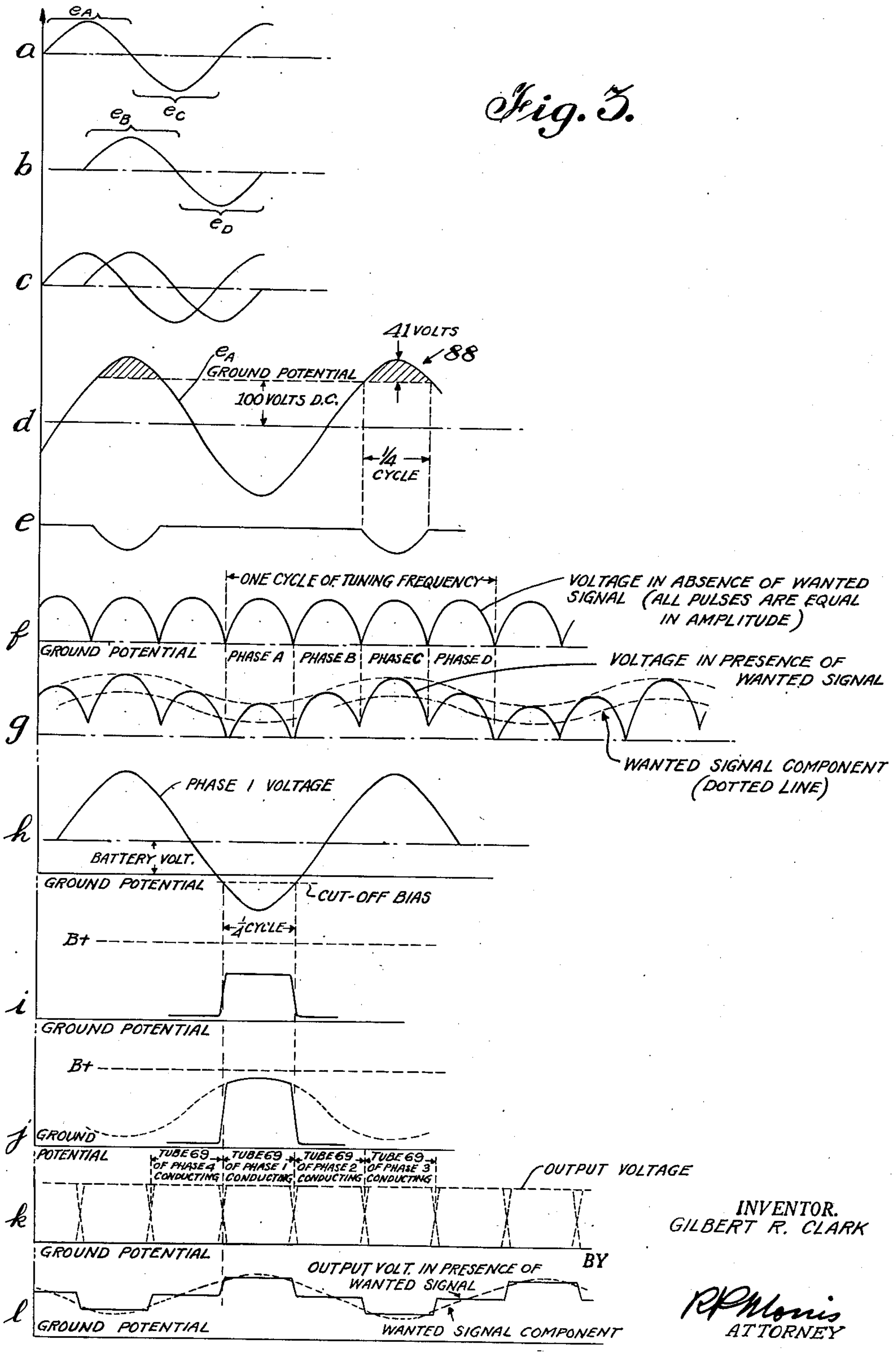
Fig. 3 is a series of graphs illustrating certain voltage and current conditions in the filter circuits of Figs. 1 and 2.

Referring to Fig. 1, let it be supposed that no input signal is being applied to the input circuit at 7, that the value of the potential of the B source 33 is minus 100 volts and that the tuning frequency voltages are sine waves 90° out-of-phase having a peak of 141 volts or 100 volts R. M. S., as indicated in graphs *a*, *b*, and *c* of Fig. 3. As shown in graph *d* of Fig. 3, the sinusoidal voltage, which is similar for all phase portions 1 through 4, combined with the ground potential is effective in producing quarter-cycle positive voltage peaks as at 88, which for the values indicated attains a value of 41 volts. This will become apparent as some of the voltages are traced around the circuit beginning with the ground 34 through the source 33, the respective secondary half of sources 27 and 28, through resistance 35, diode 5 and resistance 10 to ground at 11. It will become apparent that each of the diodes 5 is conductive while its anode 13 is positive with respect to its cathode 12, that is for the one-quarter cycle of the applied tuning frequency voltage that the shaded portion 88 (graph *d*) is present at the respective anode 13. In consequence, quarter-cycle negative pulses appear across the corresponding resistances 35 as shown in graph *e*. These negative pulses will have a peak amplitude also of about 41 volts if the drop across the input resistance 10 and diode 5 is assumed to be negligible. The various condensers 15 gradually build up to the average value of this negative potential at a rate which is substantially determined by the time constant comprised of resistances 14 and condensers 15. The resistor 14 has been chosen to have a much higher value than that of 35 and therefore it does not appreciably influence the potential across the latter. The potential of the condensers 15 at the conjunction with resistors 18 is periodically lifted positive by the corresponding tuning frequency voltage, therefore causing the diodes 16 to become conductive through resistances 18 and the common output resistor 22 for a period of time slightly under one-quarter cycle. The resulting voltage, as thus obtained from all the four phase channels, is illustrated in graph *f* of Fig. 3, the voltage being represented by series of equal amplitude pulses in the absence of a desired signal. For each cycle of the tuning frequency there will of course be four equal amplitude pulses as shown. The amplitude of these positive pulses which appear across the resistance 22 are directly influenced by the potential on the condenser 15 which is effectively in series with the respective tuning frequency voltage and the potential source 33. In this way any potential variations on the condenser 15 are commutated to the signal obtained from the output circuit across resistance 22. The value of the resistance 18 is much larger than that of 14 so that the potential of the condenser is not appreciably influenced by the current drawn through resistance 16. If a signal whose frequency is not within the passband of the filter be applied at the input, it will have a random effect on the amplitude of the quarter cycle pulses across resistances 35; at times fortuitously increasing these pulses and other times fortuitously decreasing them. The average value of the potential across resistance 35 measured over a period of time comparable to the time constant of resistance 14 and condenser 15 is not substantially affected by the presence of the applied signal. If, however, the applied signal has a frequency which is exactly the same or very close to the frequency of the tuning frequency voltage, then the applied signal voltage may either add to or subtract from the tuning frequency voltage over fairly long periods of time compared to the time constant of resistor 14 and condenser 15, and the average value of the potential across resistance 35 may be raised or lowered long enough for the condenser to fully respond to this variation. The variation then causes a corresponding variation of the output signal pulses as illustrated in graph *g*. Thus, when no signal is applied, the output of the filter consists of a continuous series of equal amplitude quarter-cycle pulses from each of the four channels shown, in sequence. If a frequency be applied which is outside of the passband as determined by the applied tuning frequency, the output is unaffected. However, if the desired signal be applied, the output pulse amplitudes are affected in such a way that, if for instance, the pulse from the first channel is thereby decreased the opposite phase pulse is increased by a like amount. This produces a frequency component in the output signal voltage at 22 which is the same as the applied signal. Hence, the desired frequency is passed through the filter. Low pass filter 26 has a cut-off frequency that is higher than the wanted signal frequency and lower than the quarter-cycle pulse frequency. It therefore transmits the former, but not the latter.

The quarter-cycle pulse ripple of graphs *f* and *g* may be reduced by interposing a D. C. source connected between resistor 22 and ground 23, the positive side being grounded. This will cause the conductive periods of diodes 16 to be more than a quarter cycle each. This overlap with respect to time will smooth the ripple somewhat.

Whereas thermionic diodes have been shown in this instance, it is permissible to employ any other type of rectifier such as selenium or copper oxide rectifiers; it is also possible to employ any type of non-linear resistance in place of the diodes, provided that this non-linearity produces a beat frequency component to appear corresponding to the difference between the tuning frequency voltage of the respective phase and the input signal voltage. While an alternating current voltage is used to commutate the applied signal to produce a uni-directional voltage, and the same alternating current voltage is used to recommutate this direct current voltage, causing it to reappear as an alternating voltage, the recommutation can, in fact, be achieved with any other frequency. The circuit will then perform the dual functions of filtering and frequency conversion. It is important in the circuit of Fig. 1 that the four tuning frequency phase voltages be equal in amplitude and that the other circuit components be equal in value.

In the circuit of Fig. 2, the operation is not critical as regards the amplitudes of the four phases of the tuning frequency voltage. Whereas triodes are employed herein, it is possible to employ other types of vacuum tubes, such as pentodes.

In this circuit the condenser 46 is the storage element in each of the four phases shown. The buildup time constant is determined principally by the resistance 60 and the condenser 46. The respective grids 57 of triodes 55 are normally held positive for ¾ of a cycle of the tuning frequency voltage. During this time the triode 55 draws a high plate current and the voltage drop across the anode resistance 54 holds the anode potential of the triode 47 to a very low value. During the remaining quarter-cycle, the triode 55 is cut off, and the IR drop across resistance 54 is now controlled by the triode 47. Therefore, quarter-cycle positive pulses appear across respective resistances 54 whose amplitudes are controlled by the input signal and are substantially independent of the magnitude of the respective tuning frequency voltages. The relationship of the tuning frequency voltage and the fixed bias on the respective grids in respect to the ground potential is shown in graph *h* of Fig. 3. The potential on condensers 46 gradually charges to the average potential which exists at the junction of resistances 54 and 60. A large portion of the potential of the storage condenser 46 is applied to the grid of the triodes 69 through the voltage divider resistances 72 and 80. Resistance 80 is connected to a negative potential at 78 so that the grid 70 is maintained negative with respect to ground for all values of potential which appear across the storage condenser. The triode 69 is non-conducting or practically so for ¾ of a cycle in each of the phases, because its anode potential is held to a low value by the current flowing through the triode 81 and the resistances 75. During the remaining quarter-cycle, tube 81 is cut off and tube 69 then draws plate current as governed by the potential applied to its grid. This current causes a quarter-cycle positive pulse to appear across output resistance 77, whose amplitude is likewise controlled by the grid potential of the tube 69 which is in turn proportional to the potential across the respective storage condensers. In graph *i* is indicated, the relationship of the ground potential, the B+ potential 53 and the variation in the anode potential of tube 55 during absence of any applied signal; in graph *j* the anode potential of the tube 55 is shown when a signal has been applied to the tube 47, the signal being indicated by the broken line.

In the above-described manner, an A. C. signal is electronically commutated to a D. C. signal, stored, and then recommutated to an A. C. signal. The series of positive pulses appearing across the output resistance 77 may be substantially rectangular in shape, with adjacent pulse edges coinciding, so that the output consists of a substantially constant D. C. voltage when a desired signal is not being received. When the wanted signal is being received, a stepped wave form appears superimposed upon the D. C. voltage across the output resistance. These conditions are illustrated in graphs *k* and *l* wherein the former shows the adjacent pulses constituting the voltage across the output resistance in the absence of the wanted signal and the latter indicating the stepped voltage across the output resistance when a desired signal is present, the signal component being shown in dashed lines. Many other circuit arrangements may be employed as embodiments of the basic principle here discussed. Filters of this type are capable of providing a very high degree of adjustable and tunable selectivity even at extremely low audio frequencies where heretofore it has been difficult to achieve such a result electronically.

While the above is a description of the principles of this invention in connection with specific apparatus, it is to be clearly understood that this description is made only by way of example and not as a limitation on the scope of this invention.

I claim:

1. A frequency wave filter comprising energy storage means having a plurality of separate submultiple portions, means for applying a periodical voltage to each of said submultiples in synchronism with corresponding phase portions of a selected frequency wave to produce a mean voltage condition on said storage means, means for electronically switching input signal energy to said storage means to modulate said mean voltage condition, and means controlled by said modulated wave in the presence of said selected frequency for electronically re-switching the resulting voltage of said storage means to an output circuit.

2. A frequency wave filter according to claim 1, in which the number of said submultiple portions comprises at least three.

3. A frequency wave filter according to claim 1, in which said means for applying a voltage includes a tuning frequency voltage source for supplying a voltage to each of said submultiple portions in turn for a portion of the frequency wave cycle which corresponds to the number of said submultiple portions.

4. A frequency wave filter according to claim 1, wherein said modulating means includes current rectifying means and a tuning frequency voltage source for supplying a voltage to each of said submultiple portions and to said rectifying means for a portion of the frequency wave cycle corresponding to the number of said submultiple portions.

5. A frequency wave filter according to claim 1, wherein said storage means has a time constant circuit associated therewith.

6. A frequency wave filter according to claim 1, wherein said re-switching means includes current rectifying means associated with each of said submultiple portions, and a tuning frequency voltage source for supplying a voltage to each of said current rectifying means for a portion of the frequency wave cycle corresponding to the number of said submultiple portions.

7. A frequency wave filter according to claim 1, wherein said modulating means includes current rectifying means, said re-switching means includes second rectifying means, and a tuning freqency voltage is included in both said modulating and said re-switching means for supplying a voltage to each of said last named means for a portion of the frequency wave cycle corresponding to the number of said submultiple portions.

8. A frequency wave filter according to claim 1, wherein said modulating means includes a diode rectifier associated with each of said submultiple portions.

9. A frequency wave filter according to claim 1, wherein said re-switching means includes a diode rectifier associated with each of said submultiple portions.

10. A frequency wave filter according to claim 1, wherein said modulating means includes an electronic switch controlled triode for each submultiple portion.

11. A frequency wave filter according to claim 1, wherein said re-switching means includes an electronic switch controlled triode for each of said submultiple portions, the grid of which is controlled by said respective submultiple portions.

12. A frequency wave filter comprising an input circuit, an output circuit, and a plurality of phase channels connected in parallel between said input and said output circuits, and in each such channel a diode rectifier having cathode and anode with its cathode connected to said input circuit; a time constant circuit including a resistance and a storage condenser in said anode circuit; a second diode rectifier having its anode connected to one side of said condenser and its cathode to said output circuit; means for supplying a controlling voltage to the anodes of said rectifiers and to said storage condenser including a negative bias and an alternating voltage, said alternating voltage being applied to each channel in turn for an equal portion of the frequency wave cycle which corresponds to the total number of said channels, means for applying variable frequency signal energy to said input circuit, and means responsive to a selected frequency band of said signal energy for overcoming said negative bias and passing a substantially pure signal of said selected frequency band to said output circuit.

13. A frequency wave filter comprising an input circuit, an output circuit, and a plurality of phase channels connected in parallel between said input and said output circuits, and in each such channel a modulator triode having its grid connected to said input circuit; a switching triode having its anode connected to a source of energizing potential together with said modulator triode; a time constant in the anode circuit of said switching triode including a resistance and a storage condenser; a re-switching triode having its grid connected together with the grid of said switching triode; an output triode having its cathode connected to said output circuit and its anode connected to a source of energizing potential together with said re-switching triode; and means for supplying a controlling voltage to the grids of said switching and re-switching triodes including a positive bias and an alternating voltage, the latter being out of phase in respect to that of an adjacent phase channel by a number of electrical degrees depending on the total number of channels.

GILBERT R. CLARK.

REFERENCES CITED

The following references are of record in the file of this patent:

UNITED STATES PATENTS

| Number | Name | Date |
|---|---|---|
| 1,559,656 | Thorp | Nov. 3, 1925 |
| 1,762,725 | Marrison | June 10, 1930 |
| 2,176,742 | La Pierre | Oct. 17, 1939 |
| 2,425,009 | Shepherd | Aug. 5, 1947 |
| 2,430,038 | Wertz | Nov. 4, 1947 |